United States Patent [19]

Wright

[11] Patent Number: 4,871,283

[45] Date of Patent: Oct. 3, 1989

[54] CONTINUOUS MIXING AND INJECTION OF LIME-FLY ASH SLURRY

[75] Inventor: Paul J. Wright, Ft. Worth, Tex.

[73] Assignee: GKN Hayward Baker, Inc., Odenton, Md.

[21] Appl. No.: 224,884

[22] Filed: Jul. 27, 1988

Related U.S. Application Data

[63] Continuation-in-part of Ser. No. 14,854, Feb. 13, 1987, abandoned.

[51] Int. Cl.$^4$ .............................................. E02D 3/12
[52] U.S. Cl. .................................... 405/263; 106/84; 405/269
[58] Field of Search ............... 405/263, 264, 269, 267, 405/258; 106/900, 84, 86

[56] References Cited

U.S. PATENT DOCUMENTS

| | | | |
|---|---|---|---|
| 4,233,015 | 11/1980 | Teague et al. | 405/269 X |
| 4,451,180 | 5/1984 | Duval | 405/269 |
| 4,470,727 | 9/1984 | Ritter | 405/258 |

OTHER PUBLICATIONS

Transportation Research Circular, published by the Transportation Research Board, entitled State of the Art: Lime Stabilization; No. 180, Sep. 1976.
Woodbine Lines, Lime Slurry Pressure Injection Soil Stabilization System for Expansive Clays, vol. 2, No. 2, Sep. 1970.
Transportation Research Record No. 568, published by the Transportation Research Board, entitled, *Swelling Soils*, by Thompson et al., a printed publication constituting a substantial duplicate of the above identified speech.
Lime Stabilization Construction Manual, published by National Lime Association, Washington, DC, Third Edition, published 1969.
Lime Stabilization of Roads, Bulletin 323, published by National Lime Association, Washington DC, First Edition.
Lime Stabilization Construction, Bulletin 326, published by National Lime Association, Washington, DC, Sixth Edition, 1976.
Lime Stabilization Construction Manual, published by National Lime Association, Washington, DC, Fifth Edition, published 1972.
Lime Handling Application and Storage, published by National Lime Association, Bulletin No. 213, Copyright 1949.
Pressure Injection Lime Treatment of Swelling Soils by Thompson, et al., delivered as published speech to the 54th Annual Meeting, Transportation Research Board, Washington, DC, Jan., 1975.
Handbook for Railroad Track Stabilization Using Lime Slurry Pressure Injection, by Blacklock, et al., published Mar., 1977 and acknowledging at numerous pages therein the state of the art at various time periods prior.

Primary Examiner—Dennis L. Taylor
Attorney, Agent, or Firm—James C. Fails; Arthur F. Zobal; Geoffrey A. Mantooth

[57] ABSTRACT

Method of treating subsurface layers of the earth for controlling movement of subsurface water and building strength of the subsurface layers characterized by injecting at a plurality of predetermined depths and at a plurality of predetermined spaced-apart locations a lime-fly ash slurry consisting essentially of water, particulate hydrated lime and particulate fly ash; the particulate lime and fly ash being present as particulate solids and a proportion of from twenty-five percent by weight of the water to as much as two hundred percent by weight of the water when employed along. The particulate solids comprise lime and fly ash in proportions ranging from three parts lime to one part fly ash to one part lime to ten parts fly ash. The injection is carried out by pumping the slurry of one of the particulate solids and water through a jet slurry mixing apparatus for aspirating in the other dry particulate solid. Preferably the fly ash will be aspirated into a slurry of the lime in water. Injection occurs within less than ten minutes from admixture so as to obtain additional strength compared to conventional prior art processes. Minor amounts of additives may be employed to obtain desired properties. In particular embodiments there are disclosed the use of additional materials such as cement, attapulgite, sandy loam and bentonite. These additional materials may be employed in concentrations of twenty-five to two hundred percent by weight of the water and are in addition to the lime and fly ash in the slurry.

10 Claims, 2 Drawing Sheets

CONTINUOUS MIXING AND INJECTION OF LIME-FLY ASH SLURRY

CROSS REFERENCE TO RELATED APPLICATIONS

This application is a continuation-in-part application of the application Ser. No. 014,854, filed Feb. 13, 1987, same inventor and same title, now abandoned.

FIELD OF THE INVENTION

This invention relates to treating subsurface layers adjacent the surface of the earth to either control movement of subsurface water or build strength of the subsurface layers or both. More particularly, this invention relates to improving the subgrade, as for reuse of environmental waste sites, stabilizing subgrades for buildings, roadbeds, slopes, and the like.

DESCRIPTION OF THE PRIOR ART

The prior art is replete with a wide variety of materials that have been employed to stabilize soil or improve subgrades in the subsurface layers adjacent the surface of the earth for a variety of purposes. The applications have been varied as improving subgrades for streets, runways, railroads, dewatering projects and more recently improving the slopes to prevent failure of slopes adjacent a highway, adjacent a view railroad or the like. Of course, pretreating building sites for reducing swell, and improving the strength and waterflow characteristics of soils has long been a problem plaguing the civil engineer and the architectural engineer. The problems have been varied and the techniques have been varied to try to overcome them. Lime slurries have been worked into the top layer, for example, the top several to as much as fourteen or more inches in depth to improve and stabilize soils, or subgrades. Other more exotic and expensive treatments such as injection of furfural alcohol that have been found to work in subterranean formations have been tried. Such exotic treatments have proven too expensive and not altogether successful because of the lack of metamorphosed rock in the subsurface layers adjacent the surface of the earth. Expressed otherwise, these exotic treatments were infeasible and engineeringly inoperable because of the numerous small cracks and crevices and the like that traverse through the soil and the soils were composed largely of sedimentary or amorphous materials, humous matter, non-crystallographic materials and other matter that could not be considered metamorphosed as with the subterranean formations.

Earlier I was a co-inventor with Gene Cain and Joe Doyle Teague in the U.S. Pat. No. 4,084,381 entitled "STABILIZATION OF EARTH SUBSURFACE LAYERS", issued Apr. 18, 1978 and assigned to Woodbine Corporation.

In the prosecution of that application, several patents were cited against the patent application as follows:

One of the patents cited, namely, Goldie, 707,840 is over seventy years old, yet its invention has not been commercially successful. The Goldie reference describes forming a cementitous mass with a ballast. This prevents water from draining from ballast and has the disadvantage of breaking and cracking under rolling trains. There is no teaching in this patent of deep injection to cure ballast pockets or sinks. It is clear that the use of a hopper to seal a localized area ballast to surface, as described in the Goldie reference is economically infeasible for repairing long mileage of tracks along a railroad.

U.S. Pat. No. 2,815,294, Havelin et al, describes a method of stabilizing soil compositions employing lime and fly ash in aggregate form. This patent does not describe the injection and, as pointed out at column 4, the mixing is carried out by breaking up the soil and mixing the soil with a lime fly ash and aggregate in predetermined portions, using soil breaking and mixing equipment such as conventionally employed for form and construction purposes. Thus, this is clearly a different process from this invention described and claimed hereinafter.

U.S. Pat. No. 2,942,993, Handy, merely shows the accelerating of a setting of a mixture of lime, soil and fly ash with a carbonate and does not teach injection.

U.S. Pat. No. 3,076,717, Minnick and 3,852,084, Webster et al, describe, similarly as did Havelin, admixing particular combinations of soil, aggregate and lime fly ash and reapplying aggregate to form a substantially homogeneous layer on top of existing soil for forming high strength foundations for highways, buildings or the like. These patents require removal of a layer of soil, if native soil is employed and not admixed on the surface, admixing with other ingredients into the homogeneous mass replacement and compaction. It is clear that these patents describe a different process from the following process. Also, they are more expensive processes.

U.S. Pat. No. 3,756,507, describes a new type of railroad track bed in which a road bed supports a multiplicity of longitudinally interconnected concrete slabs and define a space between the lateral supports and the slabs that are filled with cellular resin or elastomer. This is really a different design of road bed, not a reinforcement of existing foundation. The concrete, as Henry Ford found out with his railroad is not, per se, satisfactory. Consequently, the foam synthetic resin bodies are employed. This construction will be disadvantageous because of the tendency to trap water and be vulnerable to the vagaries of freezing and thawing contractions and expansion. Moreover, the patent describes a very expensive installation that is engineeringly feasible for replacing thousands of miles of track that exist in this country.

Also cited in the prosecution of the earlier application was Japanese 721,6840, Asahi. This patent describes grinding lime in the presence of two to ten percent water and up to 0.5 percent non-ionic surfactant to help with the grinding. A preferred non-ionic surfactant is also listed.

The Canadian Havelin patent, 585,628, is substantially the same as the U.S. case.

Subsequent to issuing, U.S. Pat. No. 4,084,381 was involved in litigation and a request for reexamination was filed by the defendant in the litigation. That request for reexamination was voluminous but can be supplied if the examiner deems this necessary. The respective references cited in that request for reexamination are as follows:

U.S. Pat. No. 3,243,962, Ratliff was one of the patents cited in that case along with Havelin 2,815,294. The Ratliff patent, 3,243,962, describes a method and apparatus for treating soil in which a slurry comprising forty percent by weight of lime and sixty percent by weight of water is injected into the soil. The patent also describes the use of a wetting agent.

Cited in the request for reexamination were several literature articles including:

"PFA in Grouting" showing the formation of typical grouts; specific surfaces and particle sizes of materials for the grouts; and the blending of cement in PFA slurries. Interestingly, the inventor of the invention in this application was invited to speak by the publisher of the articles entitled "PFA in Grouting" at a subsequent seminar on a new use of fly ash. Consequently, it appears that the publisher felt also that that invention was different from the invention described and claimed hereinafter as well as in U.S. Pat. No. 4,084,381.

Also cited in the reexamination request of U.S. Pat. No. 4,084,381 was the following:

"Grouting in Engineering Practice," Bowen, John Wiley & Sons, describes the aspects of grouting, history of grouting, current practice using material such as cement, cement and sand, clay-cement, slag-cement, resin gypsom-cement, clays, asphalt, pulverized fuel ash and a large number of colotal and low viscosity chemicals. That article also discusses openings in the soils and rocks and the use of their respective delineated ingredients specifically, as well as accelerators or other additive and inert material such as sand. There is also a discussion of the pozzolans such as the natural pozzolans comprising volcanic glass, opal, pumicite, clay minerals, zeolites and hydrated oxides of aluminum. That article also points out at page 21 that one of the most useful of the grouting additives is pulverized fuel ash (PFA) which is often employed in conjunction with cement. That article notes that it can be used alone and that its primary advantage is its low cost. This booklet has some one hundred and fifty-two pages so it is virtually impossible to quote all of its material. It is sufficient to note that it does not make obvious the invention described and claimed hereinafter.

SOIL MECHANICS AND FOUNDATIONS, third edition, the Macmillan Company, Collier-Macmillian Limited, London 1970, has a discussion of grouting and injection stabilization. There are formulas relating the parameters in grouting, as well as a discussion of injection method showing injecting into a hole with a suitable gauge to measure the pressure of the injection, also illustrating schematically grouting into open rock joints with angle holes intersecting the widest possible spread of rock joints. There is a discussion of grouting cavities and pavements.

"Soil Stabilization Principles and Practice," Ingles and Metcalf, Wiley and Sons, New York and Toronto, 1973 discloses soil stabilization by reacting lime with clay minerals of the soil or pozzolanic components such as hydrous silica to form a tough water-in-soluble gel of calcium silicate. Schematic illustrations are enclosed as are other criteria.

"CHEMISTRY AND TECHNOLOGY OF LIME AND LIMESTONE," Boynton, Interscience Publishers, a Division of John Wiley and Sons, New York, N.Y., 1966 discloses many of the reactions of limestone to produce hydrated lime. The book also has other reactions of hydrated and unslaked lime. The book also shows the ingredients of unslaked lime and of limestone.

"Soil Mechanics and Foundations Division," proceedings of the American Society of Civil Engineers, "Cement Grouting," 1962 contains in the introduction there a statement "Pressure grouting has been described as a process of injecting suitable cementitious slurries or similar materials into inaccessible places, such as underlying foundations of structures, for the purpose of sealing seams, cracks and fissures or for filling voids." There are also additional statements of projected and conceptual ideas as well as relating the necessity for field investigation of some of the ideas; for example, at page 55, there appears the quote "Pore-like openings are typical of sands and gravels, the grouting of which is not examined in detail in this report. However, the same general types of openings are found in many sandstones and volcanic rocks,..." There is a discussion of methods of treatment including the drilling and grouting by injection into the drillholes and the like. There are some seventy-one pages in this article, so it is not feasible to quote all of the material therein.

"Journal of the Soil Mechanics and Foundations Division," proceedings of the American Society of Civil Engineers, "Cement and clay grouting foundations" The Use of Admixtures in Cement Grouts. This article contains a discussion of a variety of cement and clay grouting admixtures, noting that admixtures of pozzolans, slags and natural cement can be included also there is contained a note about the addition of other pozzolans including fly ash, along with cement. There are fifteen pages in this article.

"Journal of the Soil Mechanics and Foundations Division," proceedings of the American Society of Civil Engineers, "Cement and Clay Grouting of Foundations: Suggested Specification of Pressure Grouting," shows a variety of cement and clay grouting formulations with synopsis of earlier works. There is listed equipment, grouting materials and definitions of the procedures for locating grout holes to be drilled for injection of the grout.

"Journal of the Soil and Mechanics Foundations Division," proceeding of the American Society of Civil Engineers, "Soil Mechanics and Foundations Division," presents symposium on grouting of granular materials, at Fort Campbell, on preventing vibration and on research. This article contains discussions showing drilling of large diameter holes and injecting a fill for supporting a load onto a glacial fill underneath the load. There is also a discussion of the Doshi Dam as well as schematic drawings showing the principle of grouting (32 pages in all). Included is only a copy of their foreword of the article: "Grouting, of Ft. Campbell Theater Building."

AIME PETROLEUM TRANSACTIONS, "A New Material for Deepwell Cementing," Smith, Halliburton, shows thickening times and the like for pozzolan-lime-cement admixtures with no retarders and the like and discussions.

"Grouts and Drilling Muds in Engineering Practice," Symposium of the British National Society of International Society of Soil Mechanics and Foundations Engineering at the Institute of Civil Engineers held in May 1963 shows grout injections with high pressure in deep mines with slurries including water-cement, water-bentonite, water-cement grouts with other additives and the like.

"Transportation Engineering Journal of ASCE," proceedings of the American Society of Civil Engineers, Volume 101, TE4, November, 1975, contains a variety of articles including the approach regions for railway tunnels, signaling for track guided systems, multi-mobile transportation, inter alia; and includes: "New and Conventional Uses of Fly Ash," Joshi, et al, which describes fly ash production and use in soil stabilization, manufacture of cement block, as a component of concrete mixes, lightweight aggregate, bricks and states that literature references describe stabilization of sandy and silty soils used in mixtures of fly ash and lime or cement, including a Table of the Composition of Fly Ashes and compositions of Cement Stabilized Fly Ash.

"Highway Research Record" No. 442, Soil Stabilization, Highway Research Board, 1973, describes a variety of additives such as cements for controlling soil-cement interrelationships and includes eleven reports like Determinations of Realistic Cutoff Dates for Late-Season Construction with Lime-Fly Ash and Lime-Cement-Fly Ash Admixtures. There appears in this report a discussion on the use of these materials including the typical degree day calculation for strength versus degree day. This article cites that earlier British study on LFA mixtures. The data are apparently related to admixing of soil with these slurries and then replacing the soil and do not make obvious the invention described and claimed hereinafter, although its sounds otherwise to the uninitiated and less expert soil stabilizer.

"Soil and Soil-Aggregate Stabilization," a symposium, 1955, Washington, D.C. describes state of the art soil stabilizing information and includes an article entitled "Soil Stabilization With Lime-Fly Ash Mixtures: Preliminary Studies With Silty and Clayey Soils," by Chu, Davidson, Goecker and Moh, which is again conventional stabilization.

"Highway Research Correlation Service," Highway Research Board of the National Academy of Sciences-National Research Counsel, Washington, D.C., 1962, included an article on lime and fly ash proportions in soil, lime and fly ash admixtures and some aspects of soil lime stabilization by Mateous and Davidson. The soils with which the lime and fly ash slurries were mixed were dune sand, triable loess, alluvial clay and gumbotil four limes and eight fly ashes were tried and respective seven day and twenty-eight day curing strengths were measured.

And finally that request for reexamination includes articles by the inventor of this invention, including "Stabilization By Lime-Slurry Injection, Railway Track and Structures," October, 1975, in which the inventor delineated the advantages of injection of lime slurry along a railroad track and "Southern Injects Lime Slurry to Stabilize Soft Track," containing substantially similar information by the inventor.

Moreover, other patents have been issued directed to soil stabilization including the following:

U.S. Pat. No. 3,971,222 "Soil Stabilization," Griffith, shows soil stabilization by introducing materials such as lime beneath the earths surface.

U.S. Pat. No. 3,375,872, "Method of Plugging or Sealing Formations with Acidic Salicylic Acid Solution," McLaughlin et al, describes the use of more exotic materials such as salicylic acid for plugging or sealing formations.

U.S. Pat. No. 2,680,602, Nelson, et al, "Agitator Device For Digester Tanks," describes an agitator for digester tanks.

As can be seen, none of the prior art actually make obvious the invention described and claimed hereinafter.

Experience with injection of lime-fly ash slurries has indicated several problems and several features that would be desirable that have not been heretofore provided by the prior art. In U.S. Pat. No. 4,084,381 we listed ten features that are desirable and, of course, it is desirable that the method of the invention provide those features. In addition it is desirable that the invention provide the following features not heretofore provided.

(1) The injected material should set to as high a strength as possible. Some of the prior art injections did not have as high a set strength as desired.

(2) There should be as low a loss of volume, or shrinkage, with the setting of the material such as the injected slurry of lime-fly ash.

(3) There should be as low a leachate as possible. In the prior art, some of the slurries that here employed had relatively low percentage solids so that there was a relatively high volume of leachate, or leached supernatant liquid.

(4) The method should allow pumping the slurry for injection without fly ash setting, or achieving high viscosity, during the pumping operation.

(5) The method should approach continuous bleeding and injection as near as possible, yet:

(a) allow air to escape before injection so as to be pumpable without "vapor locking" the pump and obtain as great a density of the set material as possible;

(b) allow testing of the slurry before injection in order to maintain the parameters within preset limits.

(c) allow maintaining parameters during injection (d) facilitate rapid restoration of optimum control parameters if deviations shown by the testing.

(6) The method should allow use of other additives such as retarders or inert fillers without adversely effecting the other features.

(7) The method should allow pumping higher ratios of solids to water; for example, greater amounts of lime and fly ash to the water, (referred to as percent solid) than the prior art batch approach used in U.S. Pat. No. 4,084,381. The method of this invention advantageously will allow up to twelve pounds per gallon or more to achieve higher strengths, less bleed off water and faster sets.

(8) The method of this invention should allow better introduction of additives such as accelerators by adding to the lime slurry and injecting within ten minutes to achieve a better final product and result.

(9) The method should allow a much higher production rate to the customer. For example, the old method would allow fifty to sixty tons per day whereas the method of this new invention would allow up to one hundred tons per day or more.

It can be seen that the prior art has been deficient in providing an economical process that has one or more of the foregoing features.

SUMMARY OF THE INVENTION

Accordingly, it is an object of this invention to provide a method that is economical and provides one or more of the foregoing features not heretofore provided by the prior art.

It is a specific object of this invention to provide a method that is economical and provides a plurality of the features delineated hereinbefore and not heretofore provided.

It is a specific object of this invention to provide a method that has all of the features delineated hereinbefore as desirable and not heretofore provided.

In accordance with this invention there is provided a method of treating subsurface layers of the earth for controlling movement of subsurface water and building strength of subsurface layers characterized by injecting a plurality of predetermined depths and at a plurality of predetermined spaced-apart locations a lime-fly ash slurry consisting essentially of water, particulate hydrated lime and particulate fly ash; the particulate lime and fly ash being present as particulated solids and a proportion of twenty-five percent (25%) by weight of the water by as much as two hundred percent (200%) by weight of the water when employed alone. The particulate solids comprising lime and fly ash are present in proportions in the range of from 3:1 to 1:10 and the injection is carried out by pumping a slurry of one of the particulate solids and water through a jet slurry mixing apparatus means and thereby aspirating in the other particulate solid when the slurry of the one particulate solid is pumped therethrough. The other dry particulate solid is fed thereinto such that admixture occurs substantially immediately.

Actual experience and laboratory testing has shown that the set strength and set time of the injected slurry is improved if it is not subjected to severe agitation, or admixing for a time interval greater than ten minutes and, preferably, less than six; and if it is injected within ten minutes of having passed through the high pressure pump and sent to the injectors.

One advantage of this invention is that additional ingredients such as cement, attapulgite, sandy loam or bentonite can be added in an additional percentage by weight of from twenty-five percent (25%) to two hundred percent (200%) by weight of the water to get exactly the properties needed for the injected mass once it has set up in place.

By this invention, the subsurface layers are treated in situ without requiring removal, admixture into a homogeneous mass, replacement and compaction.

DESCRIPTION OF PREFERRED EMBODIMENTS

As indicated hereinbefore and as will become clearer later hereinafter, this invention can be employed in a wide variety of circumstances for improving the subsurface layers by either controlling movement of subsurface water or building the strength of subsurface layers, or both. The descriptive matter of U.S. Pat. No. 4,084,381 is incorporated herein by reference. A portion of the descriptive matter of U.S. Pat. No. 4,084,381 is repeated for convenience of the reader.

The water that is employed in the slurry that is injected into the subsurface layers may be any of the water from economical and normally employed sources. If the water is to be displaced into a potable source of water, it should be potable itself, since the lime and fly ash do not ordinarily render it non-potable; particularly, after the water has been passed through the soil. Usually, the job will be close enough to a conventional water supply that the conventional sources of water can be employed. A conventional source may comprise city water mains, railroad storage facilities, highway department storage facilities, lakes, streams and the like. Preferably, the water will not have a high concentration of materials that would react with the lime that will be added in the slurry and would not have significant concentration of either materials referred to as retarders or accelerators in order that the water will not influence the setting of the materials in the slurry.

The lime that is employed in the slurry may be any of the conventionally available limes, such as a dolomitic lime or a high calcium lime, more accurately referred to as calcium hydroxide. The lime that is preferably employed may have minor amounts of other impurities therein, but will ordinarily analyze better than seventy percent (70%) by weight calcium oxide and better than twenty percent (20%) by weight combined moisture. The lime is particulate lime, preferably small particles. By small particles it is meant particles that will all pass through a fifty mesh standard screen and more than ninety-five (95%) of which will pass through a hundred mess screen, U.S. standard sieve size. As will be discussed in more detail hereinafter, with this concentration of calcium hydroxide, the lime will react in time with the fly ash in the slurry and with the constituents of the soil when injected to form a relatively high strength material in the soil.

The fly ash that is employed in the slurry is a pozzolanic by-product of coal-burning power plants. Preferably, the fly ash is of the "self hardening type". Expressed otherwise, the fly ash has enough lime in it to harden if compacted after being moistened and form a water impervious mass. To accomplish this, the fly ash should have an analysis that shows an excess of five percent (5%) by weight of unslaked lime, or calcium hydroxide (CaO); preferably, more than about ten percent (log) by weight thereof. A type C fly ash is preferred and in most cases lime-fly ash slurries prepared with a Type C fly ash and within the guidelines set forth herein will be satisfactory. Tests can be conducted to verify durability and suitability. Some Type F fly ashes can be employed in this process if other additives are also added to produce a mix that demonstrates durability without significant loss of strength when soaked in water. It is preferable that the fly ash have less than two percent (2%) by weight of organic carbon and should have no greater loss on ignition than two percent (2%) by weight. Table I hereinafter gives a typical chemical composition of fly ash. In Table I, the concentration is given percent by weight (% by Wt.).

TABLE I

| Component | Fly Ash Typical Analysis Concentration (% by wt.) |
|---|---|
| $SiO_2$ | 51.0% |
| $Al_2O_3$ | 18.0 |
| $Fe_2O_3$ | 5.0 |
| CaO | 20.0 |
| MgO | 3.5 |
| $SO_3$ | 1.0 |
| $Na_2O$ | .05 |
| $K_2O$ | .05 |
| Loss on ignition | .05 |
| Specific Gravity | 2.50 |

TABLE I-continued

Fly Ash
Typical Analysis

| Component | Concentration (% by wt.) |
|---|---|
| Retained on #325 sieve | 24% |
| Surface are (cm$^2$/cm$^3$) | 6300 |

The fly ash is particulate, preferably small particles size. In fly ash only one percent (1%) is retained on a fifty mesh screen, ninty-six percent (96%) passing through one hundred mesh screen.

One of the chemical reactions that occurs when hydrated lime and fly ash are injected into subsurface layers or soils, is the cementing action, commonly referred to as pozzolanic reaction The abundance of silicas and aluminas in fly ash increases the cementing action with the hydrated lime. The resulting reaction product is water insoluble and renders the fissures that formerly served as flow paths impervious to the subsurface flow of water, or moisture. In addition, the materials that are formed stabilize the soils to prevent slope failures, stabilize the soils for building foundations and performs other features delineated hereinbefore. In addition, we have found that we are able to form a cementitious type product with the reaction of the lime and fly ash alone when injected in accordance with this invention; namely, on a continuous basis or within less than ten minutes from the admixture of the lime and fly ash into the slurry.

It is frequently helpful in the preferred embodiment of this invention to employ a surfactant. In the early patent U.S. Pat. No. 4,084,381, the inventor spoke of employing a surfactant as a necessary ingredient of the preferred embodiment.

The surfactant that is normally employed in the slurry, if a surfactant is used, is preferably a nonionic type surfactant, although a cationic and anionic type surfactant can be employed. The nonionic surfactants are usually the polyethylene oxide surfactants. By polyethylene oxide surfactants is meant a surfactant molecule in which the polyethylene oxide groups are combined in an average with a moiety that is selected from a class consisting of alkyl or alkyl aryl type moiety. Illustrative of the alkyl type moieties are the hydrocarbon moieties having six to eighteen carbon atoms. Illustrative of the alkyl aryl moieties are the alkyl groups having six to twelve carbon atoms combined onto a phenyl ring. A typical nonionic surfactant is nonyl phenol with an average of from eight to one hundred mols of ethylene oxide associated with each mol of nonyl phenol Typically, an average of about thirty mols of ethylene oxide will be associated with each mol of nonyl phenol. If desired, of course, the octa-, heptyl-, or hexyl-moieties may be associated with the phenol and employ from eight to one hundred mols of ethylene oxide in association therewith, depending upon the hydrophillic versus hydrophobic characteristics desired.

Any suitable surfactant can be employed if surfactant is used. Early, a nonionic surfactant that was employed in the prior trials with this invention was the Wet-It Surfactant, Chemical Research, Inc., Dallas, Tex. As indicated, an anionic surfactant such as sodium lauryl sulfate or a cationic surfactant such as cetyl pyridinium chloride can be employed if desired.

The surfactant may be employed in a concentrated form or may be diluted and applied in an aqueous solution, the latter facilitating forming the slurry.

In the slurry of this invention, the particulate lime and the particulate fly ash are present as particulate solids in a proportion within the range of 25-200 percent by weight of the water and in a proportion of lime to fly ash within the range of from 3 to 1 (3:1) to 1 to 10 (1:10). Preferably, the lime is employed in a proportion of about one-fourth of the particulate solids and the fly ash comprises the remaining three-fourths of the particulate solids, although this proportion can vary depending upon the composition of the fly ash. Different types of jobs require different proportions; for example, application of lime-fly ash slurry for land fills may require 8-10 pounds of solids per gallon of water to prevent phase separation and reduce "bleed water". Also such injections may require a lime-rich mixture where the proportion of lime is in the range of 3:1 to 1:4.

The surfactant, when it is employed, is employed in a concentration of at least 0.001 percent by volume; preferably, at least 0.01 percent by volume The best concentration of surfactant that has been achieved is in the range of 0.01-1 percent by volume of the slurry, preferably about 0.03 by volume. Expressed otherwise, the liquid surfactant is employed in a proportion of one part to about thirty-five hundred parts slurry when the surfactant is undiluted surfactant.

The remainder of the slurry is frequently water, although other ingredients can include other dry ingredients, such as cement, attapulgite and bentonite or the like. When the latter additional ingredients are employed, they may be employed in a range of from 25 to 200 percent (25-200%) by weight of the water.

It is noteworthy in this invention that one object is to get the optimum water to minimize supernatant water or shrinkage when the lime and fly ash in slurry sets up in situ. For example, if 20 percent of the water is obtained as free water, it is not acceptable in certain applications, so the proportions need to be adjusted to obtain a range that is more nearly acceptable; for example, less than 10 to 15 percent (10-15%) and, preferably, about not more than five to eight percent (5-8%) free water. Somewhat larger free water proportions can be tolerated in certain dry clays or the like.

Additional materials, such as retarders or accelerators, may be employed to accelerate or retard the set and improve durability of the lime fly ash injected with the slurry. For example, a chemical additive may be added in an amount to effect concentration in the range of one-half to five percent ($\frac{1}{2}$-5%) by weight of slurry if desired.

As indicated, presenting as low a loss of volume as possible when the lime and fly ash sets up is desired and is one of the objects sought to be achieved by this invention. Moreover, the mixing is carried out to achieve the maximum strength possible with a given proportion of lime fly ash slurry.

With this in operation, the injection in accordance with this invention is carried out similarly as described in U.S. Pat. No. 4,084,381, but different as can be seen by considering the following descriptive matter in conjunction with the appended Figs.

Injection rigs have been developed to inject the lime-fly ash slurry into the ground but without requiring predrilled holes, although the drilling of holes and injection by way of the holes can still be performed if desired. Ordinarily, the lime-fly ash slurry will be injected at a predetermined array of holes at predetermined spacing in the neighborhood of from one to ten feet apart. For example, it has been found that an injection on about five foot centers in both lateral and longitudinal directions affords a good interlacing injection pattern that accomplishes the objectives.

Tests such as described in Bulletin 331, LIME SLURRY PRESSURE INJECTION BULLETIN, National Lime Association, Arlington, Virginia, published in 1986, can be employed for evaluating candidate sites. Often times, a site will be injected more than one time to achieve a progressive filling of the voids. A minimum curing time of 48 hours is usually allowed between each injection pass.

Figures 1, 2, 3:
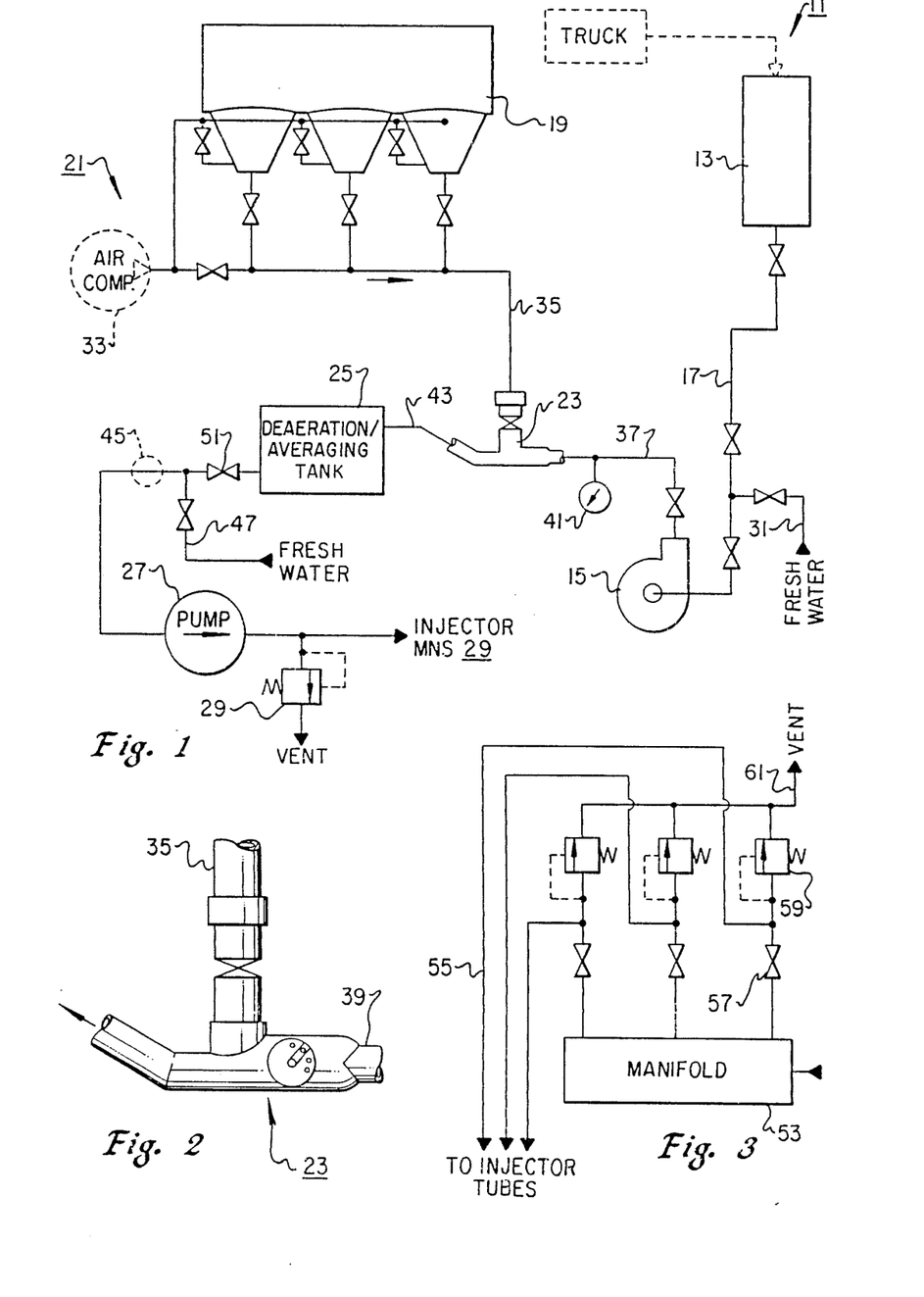
FIG. 1 is a schematic illustration of the interconnection of the respective elements for affecting admixing of the aqueous slurry of lime and fly ash in the proper proportions and injecting the resulting slurry into the near surface layers of the earth in accordance with this invention.
FIG. 2 is a side elevational view, partly schematic, illustrating a mixing assembly for admixing the last dry component, such as the fly ash, with the slurry of the first dry component in the aqueous slurry.
FIG. 3 is a schematic illustration of a preferred embodiment facilitating safely relieving pressure on plugged injector tubes.

Referring to FIG. 1, there is described a specific embodiment that has been successfully employed in accordance with this invention. Other embodiments are possible, of course.

Referring to FIG. 1, the apparatus 11 for treating subsurface layers of the earth includes a first mixing means for admixing small particulate solids of a first one of two dry ingredients consisting essentially of fly ash or lime with water to form a first slurry; and a first storage means for storing the first slurry and simultaneously maintaining the first slurry in a substantially uniform admixture so that it can be tested to ascertain that certain properties are within certain predetermined ranges. The apparatus 11 also includes a first pumping means in the form of a pump 15 for pumping the first slurry. The pump 15 is connected by way of conduit 17, with the first storage means so as to be able to pump the first slurry therefrom. The apparatus 11 also includes a second storage means 19, which may be the shipping truck itself, for storing small particles of the second of the two dry ingredients, consisting essentially of lime or fly ash in transportable form; and a means 21 for transferring, or transporting, the transferable small particles of the second dry ingredient. The apparatus 11 also includes a second admixing means 23 for admixing the second dry ingredient with the first slurry to form a second slurry referred to as a lime-fly ash slurry. The apparatus 11 also includes a deaeration/averaging tank 25. Where one of the particulate solids is fed by air to the second admixing means 23 for admixing into the slurry, it is imperative that a deaeration tank be provided to allow the air to escape from the slurry before the pump takes its suction. The pumping means 27 is also thought of as a high pressure pump, since it must generate the pressure sufficient to inject the slurry through the injector means 29. The second admixing means 23 is serially connected with the deaeration/averaging tank 25 such that the slurry can be tested in the averaging tank if desired. If there is any variable that needs correction to keep it from going out of control parameters, the correction can be made appropriately, as described herein.

The first mixing means is provided for admixing at least one of the two dry ingredients of either lime or fly ash with water to form a first slurry. Preferably, lime is the first admixed with water to form the first slurry.

The first storage means is provided for storing the first slurry and simultaneously maintaining the first slurry substantially uniformly admixed, as indicated. In the illustrated embodiment the first mixing means and the first storage means are shown in the form of a lime-water tank 13 having mixing paddles therewithin, as known in the art for admixing the slurry. Expressed otherwise, the first mixing means is a part of the first storage means and may include a plurality of paddles disposed along a longitudinally extending axis such that when the dry ingredient, such as the lime, is blown into the tank, the paddles admix it with the water and maintain it in substantially uniformly mixed condition. The tank can comprise any of the usual large tanks such as implied in U.S. Pat. No. 4,084,381 or illustrated and described in U.S. Pat. No. 4,233,015. Preferably, the tank is large enough that an entire load of lime can be incorporated into the tank, whether the lime is in the form of slaked lime or quicklime that is to be slaked in situ in the tank in accordance with U.S. Pat. No. 4,233,015.

The first pumping means is in the form of a pump. A pump designed to pump slurry is ordinarily employed. For example, a centrifugal pump may be employed although any suitable pump such as a positive displacement pump can be employed, as desired.

A conduit 17 connects serially the illustrated tank 13 and the first pumping means in the form of pump 15 and may comprise any of the usual conduit It is preferable that the conduit be readily assembled and disassembled, so it may incorporate quick-connect and quick-disconnect fittings for connecting sections of conduit or connecting sections of hoses into the conduit 17.

In the illustrated embodiment of FIG. 1, a fresh water conduit 31 with the appropriate valving is employed such that the fresh water can be added to the fluid stream as it flows, flowed back into the tank 13, or flowed through the pumping means 15, as for flushing or the like.

Ordinarily, a truck carrying the first dry ingredient is employed as a storage means such that the dry ingredient can be blown directly from the truck into the tank 13 where it is admixed with the water. Such a truck is only shown schematically in FIG. 1, similarly as is the conduit and air compressor line for blowing the dry ingredient into the tank 13.

Similarly, a second storage means 19 in the form of a truck for the other dry ingredient is illustrated in FIG. 1. These trucks may be appropriate to the nature of the dry ingredient. For example, suitable bins may be provided to facilitate flowing of a powder or small particles into a line such that the small particles can be conveyed as a fluidized stream to the receiving mixing means. As illustrated in FIG. 1, the truck 19 serving as a second storage means will hold fly ash where lime is already added into the water to form the first slurry in the tank 13. Air from a high pressure source such as an air compressor 33 may be employed to both pressurize the tank 19 and to flow air through the line 35 so as to convey the second dry ingredient, such as the fly ash, to the second mixing means 23. As will be understood, the bins on the truck 19 and their respective valves may be opened as desired to allow the small particles to flow into, or be entrained within, the air in the stream for pneumatically being conveyed as a fluidized stream to the second mixing means 23. This type of conveying is well known and need not be described in great detail herein.

Thus, it can be seen that the air from the air compressor 33 flowing through the conduit and entraining the small particles serves as the means for transferring the small particles of the second dry ingredient. In the illustrated embodiment, where lime is employed from the truck to be admixed into tank 13 with the water, the fly ash will be send through the conduit 35 to the second mixing means 23.

On the other hand, when fly ash is employed and admixed into the tank 13, lime will be in the second storage means 19. Ordinarily, it is preferable to admix the lime into the slurry and then flow the fly ash as the dry ingredient into the second admixing means 23.

The second admixing means 23 is provided for mixing the second dry ingredient consisting essentially of small particles of the second ingredient of either fly ash or lime with the first slurry to form a second slurry referred to as a lime-fly ash slurry. The second mixing means is connected with the first pumping means, as by conduit 37. The conduits 35 and 37 are ordinarily fairly large sizes; for example, 3-4 inches in nominal diameter, or larger so as to be able to convey the respective first slurry or the fluidized dry constituent to the second admixing means 23. The second admixing means 23 is ordinarily referred to as a jet mixer. For example, a Halliburton direct feed jet mixer can be employed. Such a Halliburton jet mixer is illustrated in FIG. 2. In the illustrated Halliburton jet mixture, the first slurry at pressures up to sixty pounds per square inch (60 p.s.i.) is introduced into the inlet line 39. The dry ingredient is passed through the conduit 35. In the FIG. 1 a pressure gage 41 is employed. In this type arrangement, the dry ingredient, such as the fly ash, is aspirated into the wet ingredient, such as the first slurry, to form the lime-fly ash slurry. As will be recognized, the Halliburton direct feed jet mixer has a rotary orifice internally thereof, although this is not necessary in this invention. Such a rotary orifice allows mixing different sizes of particles and different flow rates of the respective streams such as the slurry or the fluidized small particle streams. Other jet mixes can be employed as the second admixing means 23.

The deaeration/averaging tank 25 is connected with the second admixing means 23, as by way of conduit 43 for conveying the lime-fly ash slurry to the deaeration-/averaging tank 25.

The deaeration/averaging tank 25 has a volume that is much smaller than that of the large tank 13. For example, it is small enough that the lime-fly ash slurry is maintained substantially uniformly admixed therewithin just by flow of the injection rate through the tank. If desired, an additional mixer could be installed in the tank, although it has not been necessary in the embodiments that have been used to date. Specifically, a flow director, or flow baffle, can be employed to ensure that the slurry is admixed within the deaeration/averaging tank 25. Moreover, the volume of the deaeration-/averaging tank 25 is less than that required for ten minutes of pumping, For example, the pumping rate may be in excess of one hundred gallons per minute (gpm); whereas the volumetric storage capability of this tank will be only about three foot liquid in about a four foot diameter tank, or about two hundred and seventy gallons in the embodiments that we have employed. The deaeration/averaging tank allows entering gases such as air to be vented and serves as a surge means to allow testing for variables and ensures that the second or subsequent pumping means will always have adequate positive suction. The deaeration/averaging tank 25 is sometimes referred to as a holding tank.

The second pumping means in the form of pump 27 may comprise a duplex or triplex mud pump, a progressing cavity pump or the like in order to achieve the injection pressures while pumping a difficultly pumpable slurry such as the lime-fly ash slurry.

In the illustrated embodiment, a rock trap 45, FIG. 1 can be installed upstream of the pump 27 to prevent taking into the pump larger size pellets that would cause difficulty with pumping. Similarly, such rock traps, or filters, can be employed upstream of the first pumping means 15 if desired.

In the illustrated embodiment, the fresh water conduit 47 is provided for any purpose desired. For example, should the lime-fly ash slurry become too viscous, fresh water can be added to decrease the viscosity of the lime-fly ash slurry. On the other hand, the water can be flowed backward through the valve 51 into the holding tanks as a method of backflushing, or can be flowed through the pumping means 27, similarly as was the fresh water from fresh water conduit 39 float flowed through the first pumping means 15.

The second pumping means has its discharge side connected with injector means 29. As can be seen in FIG. 3, the discharge side of the second pumping means is preferably connected into a manifold 53, carried by an injection rig or the like. The manifold is then connected to injector rods, or tubes 55, by way of conduit incorporating a valve 57 on each injector The valves 57 enable controlling flow from the manifold to the respective injector tubes. Respective relief valves 59 will relieve to a vent line 61 in the event that pressure becomes too high, as by plugging of the injector tubes.

In operation, the method is carried out as a method of treating subsurface layers of the earth for controlling movement of subsurface waters, building strength of subsurface layers comprising injecting at a plurality of predetermined depths and a plurality of predetermined spaced apart locations the lime and fly ash slurry consisting essentially of water, particulate hydrated lime and particulate fly ash in the fly ash slurry. The injection is carried out rapidly after all of the ingredients are admixed into the lime-fly ash slurry, as at the second mixing means 23. Specifically, the apparatus is connected as described hereinbefore and as illustrated in FIG. 1. The lime-fly ash slurry in conduit 43 exiting the second mixing means 23 is sent through the deaeration-/averaging tank 25, the second pumping means 27, through the injector rods and into the earth layers. The injection is carried out in less than ten minutes, preferably less that five minutes after the slurry has passed through the pump 27 serving as a second pumping means 27. It has been found that this surprising building of strength can be achieved with this technique contrasted with the prior art approaches.

The following examples illustrate this.

Two lime-fly ash slurries were formed by two distinct methods. The first method serving as a type of the prior art injection was the admixing of lime and fly ash in proportion of one pound lime and three pounds fly ash per gallon of water in a large mixing tank with appropriate stirring. This lime-fly ash was then injected and had with the soil a low set strength in compression; for example, up to two pounds per square inch (psi).

EXAMPLE 1

In contrast, a lime slurry was made to the same predetermined specification, for example, one pound lime per gallon of water and the slurry fed through second mixing means 23 in the form of a Halliburton jet mixer. Fly ash was aspirated into the lime slurry and the resulting lime-fly ash slurry was quickly injected into the earth layers. Subsequent testing showed that the resulting set material in the earth layers had strengths in compression as high as 200 psi.

In some embodiments of this invention we have used up to one to three percent (1–3%) by weight of an additive such as sodium bicarbonate to ensure that the lime-fly ash slurry and soil aggregate sets up well and gives good results.

In employing the lime-fly ash slurry in land fills, additional dry solids such as the montmorillinite, cement, or the like have been added and have been injected in less than five minutes so as t give a set product that has reduced "leachate," or bleedwater.

EXAMPLE 2

In a landfill, we have employed the lime-fly ash slurry in accordance with this invention and apparently effected a cementation with the components of the landfill so as to negate escape of methane and other gases, apparently because of the tortuous paths and void filling. In addition, the pH being greater than about eight appears to kill microorganisms that produce methane gas in the anaerobic process. Also it appeared that the set material formed a structural honeycomb to add strength and reduce any later settling.

In other embodiments, additives such as cement and bentonite have been employed in the slurry and still obtain satisfactory results. The results have been so good, in fact, that we believe we can employ inert filler such as sandy loam and still obtain satisfactory results, including strength and durability.

Figure 4:
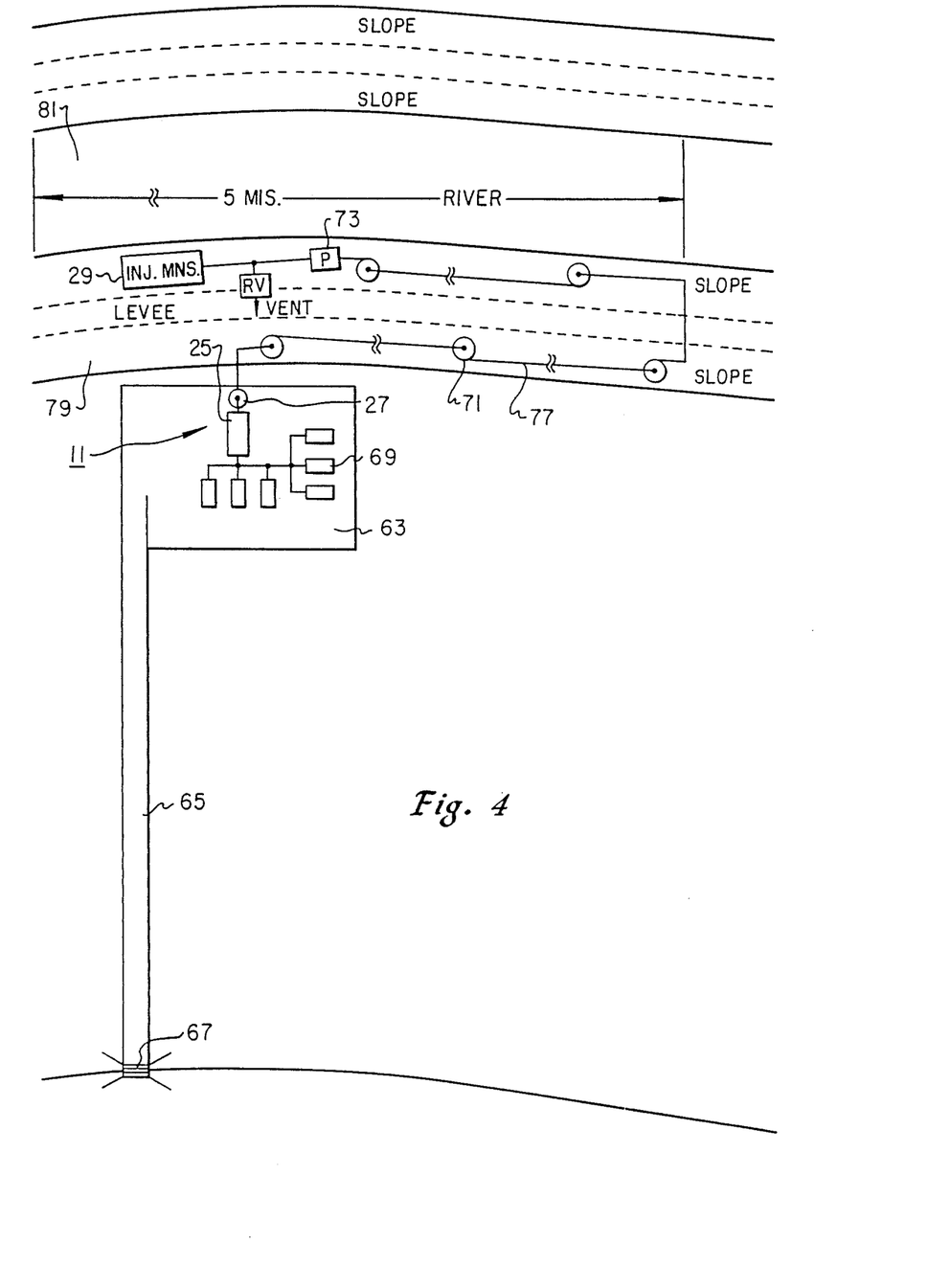
FIG. 4 is a schematic illustration of an embodiment of this invention in which the slurry line is extended for a long distance along a levy or the like, age for stabilizing the slopes of a levy adjacent a river.

Referring to FIG. 4, there is illustrated another embodiment of this invention which demonstrates the flexibility of this invention. In FIG. 4, the apparatus 11 is included on a working pad 63 serviced by a road 65 having a cattle guard 67 or the like at the entrance thereto.

Suitable tanks 69 are employed as necessary to carry out this invention. The second pumping means 27 in this instance is simply a series of centrifugal pumps through which the slurry rapidly passes without severe agitation. Merely flowing through a line is not severe agitation, whereas passage through a centrifugal pump is. It is noteworthy that the cumulative time of passage of slurry through the respective plurality of centrifugal pumps 27, as well as the other series connected pumps 71 along the line, is less than ten minutes from the time the slurry is in the deaeration/averaging tank 25 until it passes through the high pressure pump 73, and in most instances less than six minutes. In the illustrated embodiment, the track along a river or levy or the like may be up to five miles or so, such that the conduit 77 may be stretched with a plurality of pumps 71 for a distance that is appreciable. In the illustrated embodiment, injection into a levy 79 along a river 81 was carried out at distances up to five miles. While the working pads 63 can be near the center of such a long lineal distance, it still may require appreciable length of conduit 77 and a plurality of pumps 71.

It is imperative, however, that the slurry be injected through the injector means 29 and into the ground, such as the slope of the levy 79, within ten minutes after it passes through the high pressure pump 73. Preferably, the injection is within six minutes from the time it passes through the high pressure pump 73 in order to obtain best results.

As indicated hereinbefore, no more than ten minutes of cumulative agitation must be experienced by the slurry from the time the second dry ingredient is added in the jet mixing valve 23 and, in addition, the injection be carried out within ten minutes from the time it passes through the high pressure pump 73.

The reasons for the increased efficacy and the surprisingly improved performance in accordance with this invention when these precautions observed is not completely understood. However, we theorize that continued agitation breaks down an initial set of lime-fly ash slurry. This is based on laboratory and field observations using this compared with a prior method. The invention works whether or not the theory is correct. In fact, it is proven that this invention can be employed to achieve surprisingly improved performance when compared with the prior art, as illustrated in Example 1.

It is sufficient to note that in the embodiment of FIG. 4, an actual case history has been performed with the corps of Engineers and samples taken to illustrate satisfactory set of the injected slurry when performed in accordance with this invention, this set having the surprisingly improved results when compared with the prior art approaches.

The method of this invention provides the advantageous features delineated hereinbefore as being desirable and not heretofore provided (1) Specifically, this invention provides an injected material that will set to a much higher strength than heretofore possible.

(2) This invention provides an injection that has a loss of volume, or shrinkage, that is much lower than the prior art approaches.

(3) This invention provides a lower leachate than the prior art approaches.

(4) This method provides a method of pumping without the fly ash setting, or the result from slurry reaching high viscosity, during pumping. This method provides an approach that is as close as possible to continuous blending and injection yet allows air to escape, allows testing the slurry, allows maintaining parameters during injection and facilitates rapid restoration of optimum control parameters if deviation is shown by the testing.

(6) This method allows use of other additives such as retarders or accelerators or inert fillers without adversely effecting the other features of this invention.

(7) This invention allows pumping high ratios of lime-fly ash to water; that is, higher percentage solids, than the prior art methods.

(8) This invention allows better introduction of additives such as accelerators or retarders by adding them to the slurry and injecting them within ten minutes.

(9) This invention allows much higher production rates than possible heretofore.

From the foregoing it can be seen that this invention accomplishes the objects delineated hereinbefore and provides improved process in this area of technology.

Although this invention has been described with a certain degree of particularity, it is understood that the present disclosure is made only by way of example and that numerous changes in the details of construction and the combination and arrangement of parts may be resorted, to without departing from the spirit and the scope of the invention, reference being had for the latter purpose to the appended claims.

What is claimed is:

1. A method of treating subsurface layers of earth for controlling movement of subsurface water and building strength of said subsurface layers comprising injecting at a plurality of predetermined depths and at a plurality of predetermined spaced apart locations a lime-fly ash slurry consisting essentially of treatment water, particulate hydrated lime and particulate fly ash; said particulate lime and fly ash being present as particulate solids in a proportion of from twenty-five percent (25%) by weight of said treatment water to as much as two hundred percent (200%) by weight of said treatment water; said particulate solids comprising lime to fly ash in proportion ranging from 3:1 to 1:10; said injection being carried out by pumping the slurry of one said particulate solid in water through a jet slurry mixing apparatus means for aspirating in said dry other particulate solid when the slurry of said one particulate solid is pumped therethrough and said other dry particulate solid is fed thereto; such that injection occurs within less than ten minutes from the time the combined slurry of both particulate solids and water pass through a high pressure injection pump that is employed to build up pressure sufficient to affect injection into the subsurface layers through injectors; such that injection occurs and said subsurface layers are treated in situ to obtain additional strength and to obtain stabilized moisture content without requiring removal, admixture into homogeneous mass, replacement and compaction.

2. The method of claim 1 wherein surfactant is admixed into said slurry or particulate lime-fly ash and water before injection, said surfactant being added in a concentration in the range of 0.01 to 1 percent by volume of said slurry.

3. The method of claim 1 wherein said lime-fly ash slurry is pumped through a relatively small deaeration-/averaging tank to allow entrained air to escape from said slurry, to allow averaging out of controls such that parameters can be brought within control and to lower the differential volume for faster correction of a parameter that appears to be heading out of control limits.

4. The method of claim 1 wherein said slurry of both dry ingredients and water are not subjected to a cumulative mixing with the attendant agitations for a total of ten minutes after passing through said jet slurry mixing apparatus means and before delivering to the high pressure pump.

5. The method of claim 4 wherein said injection takes place before six minutes has elapsed from the time said slurry passes through said high pressure pump.

6. The method of claim 5 wherein a small amount of additional chemical is added to affect the set and improve durability of said lime and fly ash, said chemical being selected from the class known as retarders and accelerators.

7. The method of claim 6 wherein said chemical is in a concentration in the range of one-half to five percent by weight of the slurry 8. The method of claim 1 wherein at least one additional ingredient selected from the class consisting of cement, attapulgite, sandy loam and bentonite is added to said slurry in the concentration of the range of twenty-five (25%) to two hundred percent (200%) by weight of said water.

9. The method of claim 1 wherein said one particulate solid hydrated lime in said slurry with water and said other dry particulate solid is fly ash that is aspirated into admixture with said slurry of lime and water.

10. The method of claim 1 wherein said slurry of both dry ingredients and water are passed through a plurality of centrifugal pumps and in elongate conduit means before entering said high pressure pump for passage to said injectors and wherein no more than ten minutes cumulative agitation is experienced by said slurry of water and both dry ingredients upstream of said high pressure pump and wherein said slurry is injected into the surface layers within ten minutes after passage through said high pressure pump.

* * * * *